United States Patent [19]

Kufner et al.

[11] 3,812,569

[45] May 28, 1974

[54] METHOD AND APPARATUS FOR MOUNTING TERMINAL PINS

[75] Inventors: Kenneth L. Kufner, Hickory Hills; Thomas P. Pellegrino; Frank P. Chmela, both of Downers Grove, all of Ill.

[73] Assignee: Molex Incorporated, Downers Grove, Ill.

[22] Filed: Feb. 16, 1973

[21] Appl. No.: 333,360

[52] U.S. Cl. .............. 29/203 B, 29/625, 29/DIG. 46
[51] Int. Cl. .............................................. H05k 13/04
[58] Field of Search ...... 29/203 B, 203 MW, 203 R, 29/DIG. 46, 625

[56] References Cited

UNITED STATES PATENTS

| | | | |
|---|---|---|---|
| 3,241,222 | 3/1966 | Timmermans | 29/203 MW |
| 3,276,854 | 10/1966 | Felker et al. | 29/203 B |
| 3,664,015 | 5/1972 | Bakermans | 29/625 |

*Primary Examiner*—Thomas H. Eager
*Attorney, Agent, or Firm*—Mason, Kolehmainen, Rathburn & Wyss

[57] ABSTRACT

Terminal pins are mounted with a force fit into holes in a circuit board. The circuit board is placed over a backing plate having holes aligned with the circuit board holes and of large enough cross section freely to receive a terminal pin. A loading plate is placed over the circuit board and has holes each sized slidingly to receive a single terminal pin. A feeding plate having a thickness at least approximately equal to the terminal pin length is placed over the loading plate, and the feeding plate has holes of a diameter larger than about one-third of the terminal pin length. A number of terminal pins are placed on the upper surface of the feeding plate, and the feeding plate, loading plate, circuit board and backing plate are all vibrated. During the vibration a group of terminal pins are loaded into each feeding plate hole, and a single terminal pin is loaded into each loading plate hole. The feeding plate is removed from the loading plate and the excess pins are removed leaving a single terminal pin in each loading plate hole. The terminal pins are then pressed through the loading plate into the circuit board.

12 Claims, 8 Drawing Figures

METHOD AND APPARATUS FOR MOUNTING TERMINAL PINS

The present invention relates to a method of mounting terminal pins in circuit members, and to apparatus useful in carrying out the method.

A known method of mounting relatively short terminal pins in circuit boards is to place a number of the pins over a loading plate having holes aligned with circuit board holes and sized slidingly to receive a single terminal pin. The plate is vibrated, and a terminal pin seeks out each hole in the loading plate and moves to a vertical position in the loading plate hole. The mounting of the pins is completed by forcing the pins into holes in the circuit board.

Although this known method is satisfactory for pins of a relatively short length, such as no longer than three-eighths inch, this method has not been usable with pins having a longer length. It is believed that the reason for this is that longer pins are incapable of reaching a vertical position and entering a hole having a diameter only slightly larger than the cross section of the pin.

As a result, the mounting of longer terminal pins in holes in circuit members has been a problem in the past. If the pins are loaded by hand, the expense and time consumed are excessive. Machines which have been developed in the past for automatic insertion of longer terminal pins are of two types. One type positions the circuit member beneath a loading head which inserts a single terminal pin at a time. The rate of insertion with a machine of this type is quite low. Other machines capable of positioning and inserting several pins at a time, although capable of operating quickly, are extremely expensive.

Vibratory arrangements have been developed for loading wires into housings of transistors. Examples of such arrangements may be found in U. S. Pat. No. 3,241,222 — Timmermans and U.S. Pat. No. 3,276,854 — Felker et al. These arrangements, however, do not solve the problems referred to above because they are not capable of carrying out a complete loading operation both quickly and economically.

Among the important objects of the present invention are to provide an improved method and apparatus for loading terminal pins into holes in circuit members; to overcome the disadvantages of prior art methods and apparatus; and to provide a method for terminal pin mounting characterized by low cost, speed, and simplicity.

In accordance with the present invention, there is provided a loading plate having one or more holes each sized slidingly to receive a single terminal pin, and a feeding plate overlying the loading plate and having a thickness at least as large as approximately the length of the terminal pin. The feeding plate is provided with one or more holes each having a diameter larger than approximately one-third of the length of the terminal pins. The loading plate may have any desired number of terminal pin receiving holes and the feeding plate is provided with holes communicating with the loading holes in any convenient relationship. A number of terminal pins are placed on the surface of the feeding plate and the feeding plate and loading plate are vibrated. During vibration a number of terminal pins enter each hole in the feeding plate in a generally vertical position, and a single pin descends into each hole in the loading plate. The circuit member is located beneath the loading plate with its holes aligned with the loading plate holes, and the terminal pins are forced through the loading plate holes and into the holes in the circuit member.

The above and other objects and advantages of the present invention will appear from the following detailed description of the invention in connection with which reference is made to the accompanying drawings, wherein.

Figures 1, 2, 3, 4, 5, 6, 7, 8:
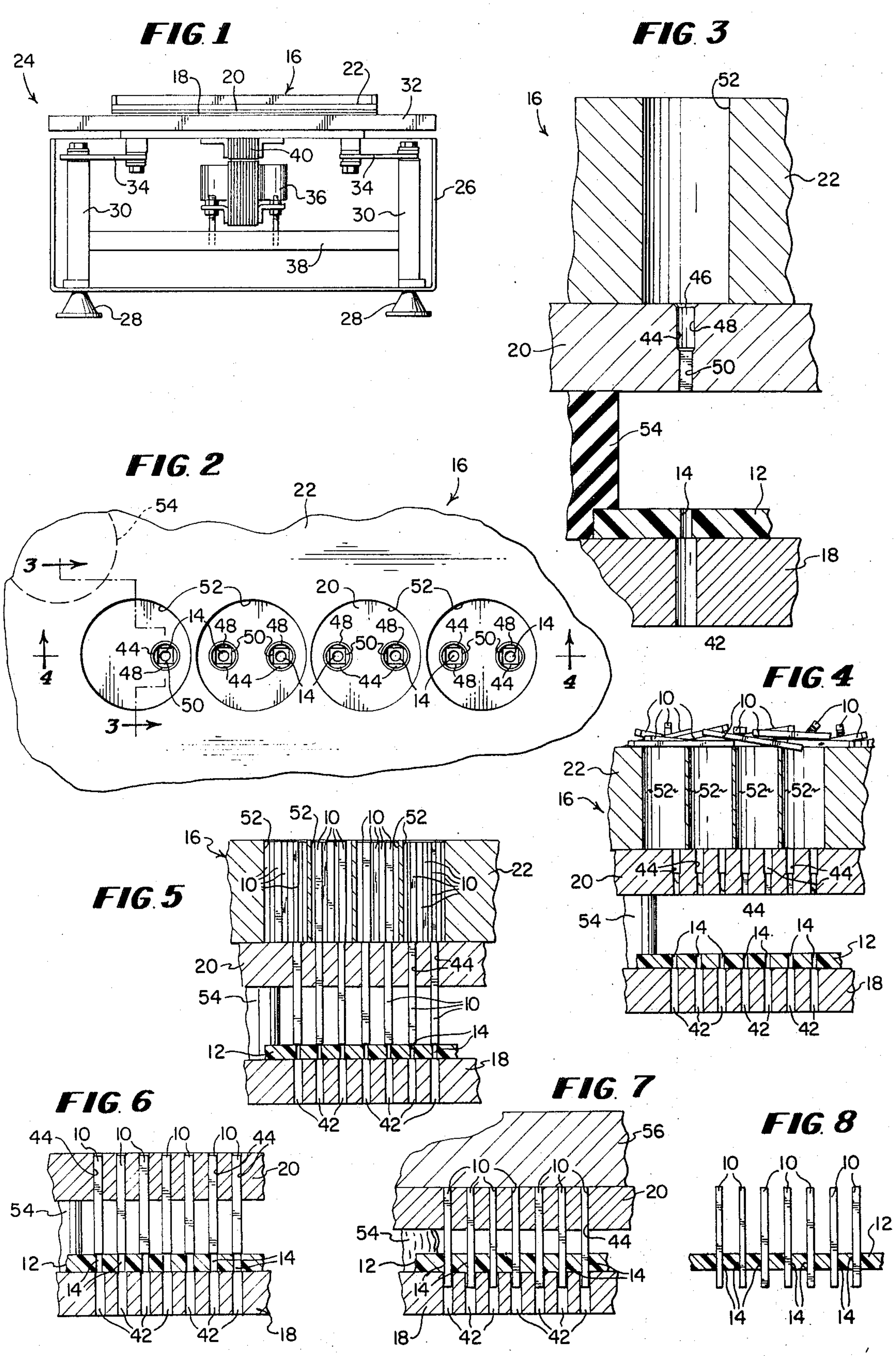
FIG. 1 is a diagrammatic, elevational view of a terminal pin mounting apparatus constructed in accordance with the present invention and useful in carrying out the method of the present invention.
FIG. 2 is an enlarged fragmentary top view of a portion of the apparatus of FIG. 1.
FIG. 3 is a sectional view taken along the line 3—3 of FIG. 2.
FIG. 4 is a sectional view taken along the line 4—4 of FIG. 2 showing a step in the method of the invention.
FIG. 5 is a view similar to FIG. 4 showing a subsequent step in the method of the invention.
FIG. 6 is a view similar to FIG. 4 showing another step in the method of the invention.

FIG. 7 in a view similar to FIG. 4 showing another step in the method of the invention; and FIG. 8 is a view similar to FIG. 4 showing a circuit member having terminal pins mounted therein by the method of the present invention.

Having reference now to the drawings, the method and apparatus of the present invention are useful in the mounting of terminal pins such as the pins 10 to circuit members such as the circuit board 12, a fragment of which is shown in FIGS. 3–8. The circuit board 12 comprises a conventional printed circuit board having a substrate formed of insulating material. For the purpose of establishing electrical connections to board circuitry, the board is provided with holes 14 at desired locations into which the terminal pins 10 are received with a force fit. In the illustrated arrangement, the board holes 14 are circular in cross section, and the pins 10 are square in cross section. The diagonal of the pin cross section exceeds the diameter of the board holes 14 so that upon pressing of the pins into the board holes 14, a rigid friction fit is obtained.

It should be understood that the principles of the present invention may be applied to terminal pins or conductors of many configurations including terminal pins having a round or other cross section. Similarly, the principles of the invention may be used to mount terminal pins in a circuit member other than a printed circuit board, such as a housing, chassis, or the like.

In accordance with the present invention, there is provided a novel plate assembly generally designated by the reference numeral 16, including a backing plate 18 and a loading plate 20 adapted to be sandwiched below and above the circuit board 12, and including a feeding plate 22 disposed above the loading plate 20. A vibrating device generally designated as 24 serves to vibrate the plate assembly 16 while a number of terminal pins 10 are supported thereon. In accordance with an important feature of the invention, a single vibrating operation serves to position a terminal pin 10 in alignment with each circuit board hole 14 so that the pins are in position to be pressed into the board holes 14.

Referring now more specifically to FIG. 1, the vibrating device 24 is illustrated in somewhat diagrammatic form. The device 24 may be conventional and includes a housing 26 supported by feet 28 and containing support posts 30. A vibrating deck or table member 32 is supported upon posts 30 by means of leaf springs 34. An electromagnet assembly 36 is carried by a platform 38 supported upon the posts 30, and an armature 40 is carried on the under surface of the deck or table member 32. Upon excitation of the electromagnet assembly 36 with an alternating current, the deck or table member vibrates in a vertical direction. One vibrating device of this type is the Model J-2D Jogger sold by the Syntron Division of F. M. C. Corporation of Homer, Pennsylvania.

The structure of the plate assembly 16 appears in more detail in FIGS. 2 and 3. The fragmentary portion of the plate assembly illustrated in FIGS. 2 and 3 serves to locate seven terminal pins 10 in alignment with seven holes 14 disposed in a straight line in the circuit board 12. Any desired number of holes 14 may be located in any desired pattern. Moreover, depending on the size of the board 12, more than one board may be contained within the plate assembly 16.

As indicated above, plate assembly 16 includes three plates — backing plate 18, loading plate 20 and feeding plate 22. During vibratory loading of the pins 10, the backing plate 18 serves the function of supporting the circuit board 12. In order to allow clearance for subsequent pressing of terminal pins 10 into and partially through the board 12, the backing plate 18 includes holes 42 aligned with the printed circuit board holes 14. Holes 42 are larger in diameter than the cross sectional size of the terminal pins 10 so that no obstruction is presented to entry of the terminal pins.

With reference now to the loading plate 20, the loading plate 20 is provided with loading holes 44, one aligned with each circuit board hole 14. As best illustrated in FIG. 3 each loading hole includes an entrance bevel 46 serving to facilitate the entry of a terminal pin 10 into the loading hole 44. The upper portion of the loading hole 44 comprises a segment 48 of circular cross section having a diameter sufficient freely to receive a single terminal pin 10 and small enough to prevent the entrance of more than one terminal pin 10. The lowermost portion of each loading hole 44 comprises a segment 50 of square cross section having sides slightly larger than the sides of the square terminal pins 10. The function of the square segment 50 is to orient the terminal pins 10 relative to the circuit board 12 in the desired manner.

In the past, plate assemblies including loading plates such as the loading plate 20 and backing plates such as the backing plate 18 have been used to position relatively short terminal pins relative to circuit boards. For example, in a known process terminal pins having a length of three-eighths inch or less have been positioned with the use of a loading plate such as the plate 20. It has been found, however, that pins having a length longer than three-eighths inch are incapable of entering a loading hole such as the hole 44. It is believed that this difficulty is due to the fact that upon vibration terminal pins substantially longer than the loading hole diameter cannot reach a vertical position and enter the loading hole. Because holes capable of receiving only a single pin have not been usable with pins longer than about three-eighths inch, in the past it has not been possible to use a simple vibratory operation to position terminal pins of longer lengths.

In accordance with the present invention, this obstacle encountered with prior art arrangements is overcome and it is possible to position terminal pins of longer lengths in a single, simple vibratory operation. Through the use of the feeding plate 22 in conjunction with the loading plate 20, it is possible to mount pins having lengths much longer than three-eighths inch both rapidly and economically.

As best appears in FIGS. 2 and 3, the feeding plate 22 is provided with a number of feeding holes 52. The feeding holes 52 are larger in diameter than the loading holes 44 of the loading plate 20. Due to the larger mouth or upper openings of the feeding holes 52, upon vibration pins of lengths longer than three-eighths inch are capable of entering the feeding holes 52. In practicing the invention, upon vibration a group of pins 10 are loaded into each feeding hole 52, while single pins 10 are loaded into each loading hole 42.

More specifically, it has been found that the diameter of the mouth portion of the feeding holes 52 should be at least as large as approximately one-third the length of the terminal pin in order to accomplish vibratory loading. In order that the pins upon loading are maintained in a generally vertical position, the diameter of the feeding holes 52 should be preferably no larger than approximately one-half the length of the terminal pin. For the same reason, the thickness of the feeding plate should be at least equal to approximately the length of the terminal pins. This thickness is considered to be approximate because, for example, if the diameter of the feeding hole 52 is somewhat smaller than one-half of the length of the terminal pin, the thickness of the plate might be somewhat less than the length of the terminal pin and still be capable of maintaining the terminal pins 10 in a generally upright position.

Certain steps in carrying out the method of the present invention are illustrated in FIGS. 4–8. In the preferred practice of the invention as indicated in FIG. 4, the circuit board 12 is sandwiched above the backing plate 18 and below the loading plate 20 while the feeding plate 22 is placed over the loading plate 20. Suitable pins (not shown) on the backing plate 18 are used to locate the board 12 in the proper position, and compressible spacers or strippers 54, one of which is illustrated in part in FIGS. 2–7, maintain a space between the backing plate 18 and the feeding plate 20. However, it is not necessary in practicing the invention in its broader aspects to locate the circuit board 12 and backing plate 18 in position prior to vibratory positioning of the terminal pins 10, and other structure could be used if desired to prevent pins 10 from dropping through the loading holes 44.

After assembly of the plate assembly 16, the plate assembly 16 is positioned upon the deck or table 32 of the vibrating device 24 in any suitable manner. Preferably, the plate assembly 16 is not precisely horizontal, but rather is slightly inclined relative to horizontal so that during the vibratory operation excess terminal pins 10 migrate across the plate assembly 16 to a suitable collection container or the like (not shown).

Prior to or during operation of the vibrating device 24, a number of terminal pins 10 equal to or preferably in excess of the number to be mounted in board holes 14 are placed upon the upper surface of the feeding plate 22. This condition is illustrated in FIG. 4 of the drawings.

During vibration of the plate assembly 16, the terminal pins 10 are loaded into the feeding holes 52 and into the loading holes 44 of the feeding plate 22 in the loading plate 20 respectively. More specifically, during vibration, the pins 10 move over the upper surface of the feeding plate 22 and search out the feeding holes 52. Groups of pins are upended into a generally vertical position and descend into each feeding hole 52. After a short period of vibration, which typically is no more than ten or fifteen seconds, a group of pins 10 is positioned in each feeding hole 52, as illustrated in FIG. 5.

As best illustrated in FIGS. 2 and 4, each loading hole 44 of the loading plate 20 communicates with one of the feeding holes 52. Where convenient or desirable, it is possible to have more than a single loading hole 44 opening into a single feeding hole 52. In some cases, depending upon the spacing of the holes 14 in the printed circuit board 12, there may be as many as two, three, four or more loading holes 44 opening into a single feeding hole 52.

During the vibrating operation when groups of pins enter into each feeding hole 52, a single pin also enters each loading hole 44 of the loading plate 20. Each such pin enters the circular portion 48 of the loading hole and is properly oriented by the square segment 50 of the loading hole. The lowermost portion of the pin as shown in FIG. 5 bottoms against the circuit board 12. In the illustrated arrangement, since the board holes 14 receive the pins with an interference fit, the pins 10 do not at this time enter into the circuit board 12.

After completion of the vibratory loading operation, the feeding plate 22 may be lifted from the loading plate 20, causing those pins held within the feeding holes 52 but not entering the loading holes 44 to be released onto the surface of the loading plate 20. These excess pins can then be removed from the surface of the loading plate 20 in any desired manner. In the preferred practice of the invention, the removal of excess pins may be carried out by operation of the vibrating device 24 so that the excess pins migrate over the surface of the loading plate 20 to the pin container.

After lifting of the feeding plate 20 and removal of the excess pins, a single terminal pin 10 remains in each loading hole 44 as illustrated in FIG. 6 of the drawings. In order to complete mounting of the pins into the circuit board, each pin 10 is pressed downwardly through the loading plate 20 and into the holes 14 in the circuit board 12. As indicated in FIG. 7, this pressing operation may conveniently be carried out by means of a pressure plate 56. During pressing, strippers 54 are compressed and function to separate plates 18 and 20 after completion of the pressing operation. The holes 42 in the backing plate permit the terminal pins 10 to be pressed through the board 12 so that their lowermost portions are exposed on the opposite side of the board. In the event that this configuration is not required, it would be possible for the backing plate 18 to be a solid plate member.

After forcing of the terminal pins 10 into the board 12, the pressure plate 54 is withdrawn and the circuit board 12 is removed from the plate assembly 16. A portion of the completed board 12 including mounted terminal pins 10 is illustrated in FIG. 8.

It should be appreciated that the method and apparatus of the present invention may be utilized to position and mount terminal pins of many sizes. In the arrangement illustrated in the drawings, the terminal pins 10 had a length of seven-sixteenths inch and had sides of 0.025 inch. The feeding plate 22 had a thickness of seven-sixteenths inch and had circular feeding holes of 0.189 inch diameter. As further illustrative examples, the principles of the invention have been utilized to position terminal pins having lengths of one-half inch, five-eighths inch, and one inch. In positioning such pins, the feeding plates had thicknesses of one-half inch, five-eighths inch and one inch respectively and the feeding holes had diameters of 0.234 inch, 0.281 inch and 0.453 inch respectively. In another operation, terminal pins having a length of three-quarter inch were positioned with a feeding plate having a thickness of three-quarter inch and having feeding holes having a three-eighth diameter inch mouth opening at the upper portion thereof and a one-quarter diameter inch lower portion. The specific dimensions set forth above are given as examples and should not be taken to limit the present invention.

Although the present invention has been described with reference to details of the illustrated embodiment, it should be understood that various modifications and alterations will appear to those skilled in the art. The details of the illustrated structure should not be taken to limit the present invention which is defined in the following claims.

What is claimed and desired to be secured by letters patent of the United States is:

1. A terminal pin mounting method utilizing a loading plate having a hole sized slidingly to receive a single terminal pin, said method comprising the steps of overlaying the loading plate with a feeding plate having a thickness at least as large as approximately the pin length and having a hole with a diameter larger than approximately one-third the pin length with the feeding plate hole overlying the loading plate hole, supporting a plurality of terminal pins on the feeding plate, and simultaneously vibrating the loading and feeding plates in order to position a group of terminal pins in the feeding plate hole and to position one terminal pin of the group in the loading plate hole.

2. The method of claim 1 further comprising positioning a circuit member beneath the loading plate with a hole in the circuit member aligned with the loading plate hole.

3. The method of claim 2 wherein said positioning step is carried out prior to said vibrating step.

4. The method of claim 2 further comprising the steps of lifting the feeding plate from the loading plate after said vibrating, and removing the remaining terminal pins of the group from the surface of the loading plate while leaving the single terminal pin in the loading plate hole.

5. The method of claim 4 further comprising the step of forcing the terminal pin through said feeding plate hole and into said circuit member hole.

6. The method of claim 5 further comprising the step of underlaying the circuit member with a backing plate having a hole aligned with the circuit member hole before said forcing step.

7. The method of claim 6 wherein said underlaying step is carried out prior to said vibrating step.

8. A method of mounting a single terminal pin in a hole in a circuit member comprising the steps of:

locating the circuit member beneath a first plate having a hole with a cross section slightly larger than the terminal pin cross section, the hole in the first plate being aligned with the hole in the circuit member;

locating a second plate over the first plate, the second plate having a hole with a width equal to more than about one-third of the pin length and a length greater than one-half the pin length, aligning the hole in the second plate over the hole in the first plate, placing a plurality of terminal pins on the upper surface of the second plate; and simultaneously vibrating the plates and circuit member to load a bunch of terminal pins in the hole in the second plate and to load a single terminal pin of the bunch in the hole in the first plate in alignment with the hole in the circuit member.

9. The method of claim 8 further comprising the step of forcing the single terminal pin through the hole in the first plate into the hole in the circuit member.

10. A method of mounting a terminal pin in a hole in a circuit member comprising the steps of:

a. placing a number of terminal pins on the upper generally horizontal surface of a first plate member having a thickness approximately equal to or greater than the length of the pin and having a hole therethrough with an upper mouth opening with a diameter approximately within the range of from one-third to one-half of the length of the pin;

b. vibrating the first plate member to load a bunch of the terminal pins in a generally vertical orientation in the hole in the first plate member;

c. locating a second plate member having a hole of sufficient diameter to receive a single pin beneath the first plate member;

d. vibrating the first and second plate members to load a single pin in the hole in the second plate member;

e. locating the circuit member against the second plate member with the hole in the circuit member aligned with the hole in the second plate member; and f. forcing the terminal pin into the hole in the circuit member.

11. The method of claim 10 wherein said steps (b) and (d) are carried out simultaneously and wherein said steps (c) and (e) are carried out prior to said steps (b) and (d).

12. Apparatus for mounting terminal pins in holes in a circuit member comprising a backing plate for supporting the circuit member on the upper surface thereof, said backing plate having holes aligned with the circuit member holes, said backing plate holes being larger in cross section than the terminal pins, a loading plate adapted to overlie the circuit member and having holes aligned with the backing plate holes, said loading plate holes each being sized slidingly to receive a single terminal pin, and a feeding plate overlying said loading plate, said feeding plate having a thickness at least approximately equal to the terminal pin length, a plurality of holes in said loading plate each having a diameter larger than approximately one-third the terminal pin length, said loading path holes being located beneath said feeding plate holes, and means for vibrating said backing, loading and feeding plates.

* * * * *